United States Patent [19]

Kuechler et al.

[11] Patent Number: 4,521,395
[45] Date of Patent: Jun. 4, 1985

[54] PROCESS FOR OXIDATION AND AMMOXIDATION

[75] Inventors: Thomas C. Kuechler, Maryland Heights; Jerry R. Ebner, St. Charles; Tao P. Li, Chesterfield, all of Mo.

[73] Assignee: Monsanto Company, St. Louis, Mo.

[21] Appl. No.: 553,203

[22] Filed: Nov. 18, 1983

[51] Int. Cl.$^3$ .............................................. C01C 1/02
[52] U.S. Cl. .................................... 423/376; 568/471; 568/472
[58] Field of Search ........................................ 423/376

[56] References Cited

U.S. PATENT DOCUMENTS

| | | | |
|---|---|---|---|
| 1,602,404 | 10/1926 | Frazer | 252/471 |
| 1,937,489 | 11/1933 | Jenness | 252/471 |
| 2,006,981 | 7/1935 | Andrussow | 423/376 |
| 3,911,089 | 10/1975 | Shiraiski et al. | 423/376 |
| 3,914,387 | 10/1975 | von Jordon et al. | 423/555 |

FOREIGN PATENT DOCUMENTS 51-10200  1/1976  Japan.
54-126698 10/1979  Japan.

*Primary Examiner*—John Doll
*Assistant Examiner*—Wayne A. Langel
*Attorney, Agent, or Firm*—S. M. Tarter; R. R. Jones

[57] ABSTRACT

A process for the ammoxidation of methanol or formaldehyde to hydrogen cyanide or oxidation of methanol to formaldehyde using a catalyst comprising boron and phosphorus oxides, wherein the boron to phosphorus atomic ratio is 0.8:1 to 1.25:1.

6 Claims, No Drawings

PROCESS FOR OXIDATION AND AMMOXIDATION

BACKGROUND OF THE INVENTION

1. Field of the Invention

The invention relates to the oxidation and ammoxidation of methanol or formaldehyde to hydrogen cyanide or methanol to formaldehyde.

2. Description of the Prior Art

Hydrogen cyanide is a basic chemical building block for many chemical processes. Hydrogen cyanide has been mainly produced by the ammoxidation of methane (Andrussow process) and is also obtained as a by-product in the preparation of acrylonitrile by the ammoxidation of propylene. Because hydrogen cyanide is poisonous, shipment of large amounts of hydrogen cyanide has been avoided. Usually hydrogen cyanide is produced and consumed at the same location. The Andrussow process is described in U.S. Pat. No. 2,006,981.

Frequently, hydrogen cyanide-consuming facilities were developed next to facilities that produced hydrogen cyanide, e.g., acrylonitrile units. Recent improvements in the catalyst for acrylonitrile production have resulted in increased yields of acrylonitrile at the expense of reduced yields of hydrogen cyanide. Accordingly, there has been quite a demand for better methods of making hydrogen cyanide from inexpensive, easily transportable, starting materials such as methanol or formaldehyde.

In Japanese Kokai No. 51 1976-10200, a metal oxide catalyst for the ammoxidation of methanol to HCN, consisting of antimony and at least one of iron, cobalt, nickel, manganese, zinc, and uranium, with an atomic ratio of antimony to additional elements varying from 1:10 to 10:1 is disclosed. This catalyst can be used with or without a support, but a silica support is preferred.

Japanese Kokai No. 54 1979-126698 discloses a catalyst for ammoxidation of methanol to HCN, which catalyst is supported on 30 to 70 weight percent silica and has the following empirical formula:

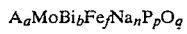
$A_aMoBi_bFe_fNa_nP_pO_q$ where A is potassium, rubidium, or cesium, Mo is molybdenum, Bi is bismuth, Fe is iron, Na is sodium, P is phosphorus, and O is oxygen and the subscripts represent the number of atoms of each component.

U.S. Pat. No. 3,911,089, the teachings of which are incorporated by reference, discloses a process for preparing hydrogen cyanide from methanol or formaldehyde using a catalyst primarily containing molybdenum and bismuth oxide. In its broadest teaching, there is disclosed catalyst whose active components correspond to the formula:

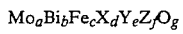
$Mo_aBi_bFe_cX_dY_eZ_fO_g$ wherein X is Cr, Mn, Co, Ni, Zn, Cd, Sn, W or Pb, Y is one or more of Tl and elements of Group IA or IIA in the Periodic Table, and Z is one or more of P, As, and Sb. The catalyst can be used alone or is preferably incorporated on a suitable carrier such as silica, alumina, diatomaceous earth, silicon carbide or titanium oxide.

The catalysts disclosed in the examples of this patent usually contain three to six active elements, not counting the support and oxygen. Many of the catalysts disclosed contain small amounts of iron and phosphorus, in addition to the molybdenum and bismuth which are the primary catalytic components.

It is desirable in the art to develop an active catalyst system for use in the ammoxidation of methanol to hydrogen cyanide which would not require complicated catalyst manufacturing procedures and which would also give yields as good as or better than the more complicated prior art catalysts.

It has been discovered that a very simple catalyst system is effective for the ammoxidation of methahol to hydrogen cyanide, as long as the ratio of active catalytic elements is carefully maintained.

SUMMARY OF THE INVENTION

Accordingly, the present invention provides a process for the ammoxidation of methanol or formaldehyde feed to hydrogen cyanide comprising passing said feed along with ammonia and oxygen or oxygencontaining gas into an ammoxidation reaction zone operated at ammoxidation conditions and containing catalytically effective amounts of boron and phosphorus and wherein the atomic ratio of boron to phosphorus is within the range of 0.8:1 to 1.25:1.

In a more limited embodiment, the present invention provides a process for the ammoxidation of methanol to hydrogen cyanide comprising feeding to an ammoxidation reactor operated at ammoxiation reaction conditions, a feed comprising methanol, ammonia and oxygen and wherein the ammoxidation reaction zone contains a fluidized bed of ammoxidation catalyst comprising $B_aPO_x$ wherein a is 0.8 to 1.25 and x is the total number of the oxygen atoms in the oxides of the other atoms, and hydrogen cyanide is produced in the ammoxidation reaction zone as a product of the process.

In another embodiment, the present invention provides a process for the production of carbonyl compounds comprising passing a feed comprising an alcohol and oxygen into an oxidation zone operated at oxidation conditions and containing catalytically effective amounts of boron and phosphorus and wherein the atomic ratio of boron to phosphorus is within the range of 0.8:1 to 1.25:1.

DETAILED DESCRIPTION OF THE INVENTION

The catalyst used in accordance with the present process can be prepared by conventional means. Soluble compounds of boron and phosphorus can be dissolved in water, or a slurry of the catalytic elements can be formed. The solution or slurry can be mixed with the carrier, or allowed to dry as a cake, or spray-dried, or any other conventional catalyst finishing steps can be used. After drying, the catalyst is preferably subjected to conventional calcination such as by heating at 200° to 1000° C., preferably in an oxidizing atmosphere, to fix the catalyst composition.

Although the catalyst can be used neat, it is preferred to operate with a support. Preferred are inert supports such as $SiO_2$, $TiO_2$, $Al_2O_3$, and other supports commonly used. Especially preferred is use of $SiO_2$ and $Al_2O_3$. The support may be mixed with the active catalytic components in one or more steps. No change in activity is noticed with, e.g., multi-step silica addition.

The boron compounds that can be used include any which can be incorporated into a catalyst. Preferred compounds include boric acid, boron oxides, boron halides and similar compounds.

The phosphorus compounds that can be used include any that are known in the art, including $P_2O_5$, $H_3PO_4$, $NH_4H_2PO_4$, $(NH_4)_2HPO_4$, and similar compounds.

The ammoxidation reaction conditions used are those disclosed in the art for the ammoxidation of methanol and formaldehyde, typically, temperatures of 200° to 600° C., with better results obtained at 250° to 550° C., and best results being obtained at 300° to 500° C.

The oxidation reaction conditions used are about the same as ammoxidation conditions, the primary difference being absence of ammonia from the feed.

The molar ratio of reactants in the ammoxidation reaction zone is conventional. Usually, the molar ratio of ammonia and oxygen to methanol or formaldehyde is near stoichiometric so that most of the reactants will be consumed in the reaction. Usually, the ammonia to methanol, or formaldehyde, ratio is 0.7:1 to 2:1, preferably 0.9:1 to 1.3:1. Use of less ammonia increases the yield of formaldehyde from methanol, and formaldehyde is a valuable product. Use of excess ammonia is not desirable because the unreacted ammonia must be recovered and recycled, or wasted.

Air is the preferred oxygen source because it is cheap; however, pure oxygen or oxygen-enriched air may also be used. Flammable mixtures should be avoided.

Some steam may be added to the reaction zone to cut down on the possibility of forming an explosive mixture. Steam may increase slightly the selectivity of the reaction for HCN. When steam is added, it will usually be present in an amount equal to 1 to 20 mole percent of the reactants; however, it is preferred to operate without steam. Steam adds to the cost of the process by increasing the mass of material flowing though the reactors; and the steam must be heated and cooled, and ultimately separated from the HCN product. The catalysts of the present invention give such good results that there is no need to add steam.

Inert diluents may be present, and their use is common in laboratories, but not common commercially, except for nitrogen which is usually carried along with the air supplying to the reaction zone.

Although it is preferred to operate with fluid bed operation, the process should work very well in a fixed bed, ebulating bed, or moving bed type of operation. A fluidized bed is preferred because problems of hot spots and distribution within the bed are minimized. Fluid bed operation also permits easy addition and withdrawal of catalyst if this is necessary to permit replacement or regeneration of catalyst.

Using the catalyst of the present invention, it should be possible to use formaldehyde as a feed stock. The ammoxidation product will be the same as when a methanol feed is used, i.e., HCN.

Other reactions which can be promoted using the catalysts include oxidation of alcohols to aldehydes and the ammoxidation of alcohols to nitriles.

EXAMPLE 1

In this example, a $B_1P_1O_x/50\%$ $SiO_2$ catalyst was prepared. 50 g of boron phosphate sold commercially was ballmilled with 125 g of 40% silica sol. The slurry was heated to dryness and then more completely dried in a vacuum oven. The resulting dried material was ground, sieved out, and then calcined at 550° C. for 2 hours.

EXAMPLE 2

The catalyst of the above example was evaluated to determine the HCN yield and the methanol conversion in a fluidized bed reaction vessel having an inside diameter of about 14 mm. Approximately 25 grams of catalyst was used. A reactant mixture of oxygen, ammonia, and methanol, and the balance helium, was passed upward through the catalyst bed to give the value of W/F as given in the Table. The reactor pressure was 10 psig, 1.68 atm, absolute. The results of the reactions have been set forth in the Table.

"W/F" is defined as the weight of catalyst in grams divided by the flow rate of the reaction stream in ml/sec measured at STP.

$$\frac{\text{(mols } CH_3OH \text{ in feed)} - \text{(mols } CH_3OH \text{ in effluent)}}{\text{mols } CH_3OH \text{ in feed}} \times 100\%$$

"% HCN Yield" is defined as follows:

$$\frac{\text{mols HCN formed}}{\text{mols } CH_3OH \text{ in feed}} \times 100\%$$

TABLE

| | |
|---|---|
| Rx Temp. °C. | 467 |
| Press., psig | 10 |
| Feed, Vol. % | |
| $CH_3OH$ | 6.5 |
| $NH_3$ | 6.6 |
| $O_2$ | 16.8 |
| W/F, g-sec/ml | 5 |
| $CH_3OH$ Conv. % | 86.6 |
| HCN Yield % | 63.4 |
| B/P Atomic ratio | 1–1 |

EXAMPLE 3

The following catalyst was prepared in the manner illustrated in Example 1.

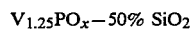

$V_{1.25}PO_x - 50\%$ $SiO_2$

When this catalyst was used to make HCN from oxygen, ammonia, and methanol in the manner illustrated in Example 2 using a reaction temperature of 435° C., a W/F ratio of 1.5, a reactor pressure of 10 psig, a feed volume of 6.5% methanol, 6.6% ammonia, and 16.8% oxygen with the balance of the feed being helium, a HCN yield of only 8.8% of HCN was obtained.

Not all metal phosphates are effective. It has been shown that vanadium phosphate catalysts are not generally effective.

What is claimed is:

1. A process for the ammoxidation of methanol to hydrogen cyanide comprising feeding to an ammoxidation reactor operated at ammoxidation reaction conditions including a temperature of 200° to 600° C. a feed comprising methanol, ammonia, and oxygen and wherein said ammoxidation reactor contains a fluidized bed of ammoxidation catalyst consisting essentially of $B_aPO_x$ wherein a is 0.8 to 1.25 and x is the total number of the oxygen atoms in the oxides of the other atoms, and hydrogen cyanide in high yields is produced in the ammoxidation reactor as a product of the process.

2. Process of claim 1 wherein said catalyst is on a support, and said support comprises 10 to 90 wt % of said catalyst.

3. Process of claim 2 wherein said support is silica.

4. Process of claim 2 wherein said support is alumina.

5. Process of claim 2 wherein said support is 35 to 65 wt % of the catalyst.

6. Process of claim 1 wherein said catalyst is boron phosphate.

* * * * *

UNITED STATES PATENT AND TRADEMARK OFFICE
CERTIFICATE OF CORRECTION

PATENT NO. : 4,521,395
DATED : June 4, 1985
INVENTOR(S) : T. C. Kuechler, Jerry R. Ebner, Tao P. Li It is certified that error appears in the above-identified patent and that said Letters Patent is hereby corrected as shown below:

Column 2, line 18 "oxygencontaining" is changed to "oxygen-containing";

Column 4, line 10 the following is inserted:
---"% $CH_3OH$ Conversion" is defined as follows:--

Signed and Sealed this

*Seventeenth* Day of *September 1985*

[SEAL]

*Attest:*

DONALD J. QUIGG

*Attesting Officer*

*Commissioner of Patents and Trademarks—Designate*